US 8,971,520 B1

(12) United States Patent
Bryce et al.

(10) Patent No.: US 8,971,520 B1
(45) Date of Patent: Mar. 3, 2015

(54) METHOD FOR OPTIMIZING SKILL ASSIGNMENT IN CALL CENTER AGENT APPLICATIONS

(75) Inventors: Daniel John Bryce, Altadena, CA (US); William Carl Hodgins, Silver Lake, CA (US); Randal Cameron Sue, Cerritos, CA (US)

(73) Assignee: Answer Financial Inc., Encino, CA (US)

( * ) Notice: Subject to any disclaimer, the term of this patent is extended or adjusted under 35 U.S.C. 154(b) by 2167 days.

(21) Appl. No.: 11/925,589

(22) Filed: Oct. 26, 2007

Related U.S. Application Data

(60) Provisional application No. 60/855,035, filed on Oct. 27, 2006.

(51) Int. Cl.
*H04M 3/00* (2006.01)
*H04M 5/00* (2006.01)

(52) U.S. Cl.
USPC ............ 379/265.12; 379/265.11; 379/265.13; 379/266.01; 379/266.02

(58) Field of Classification Search
CPC ............... H04M 15/8044; H04M 2215/42; H04M 15/90; H04M 24/02; H04M 3/5175; H04M 3/5166; H04M 3/5183; H04M 3/5233; H04M 3/42323; H04M 3/51; H04M 2203/402; H04M 3/5158; H04M 3/5237; H04M 3/5232; H04M 3/523
USPC ............... 379/265, 266, 265.12; 709/228; 370/352, 353, 354, 355, 356, 357
See application file for complete search history.

(56) References Cited

U.S. PATENT DOCUMENTS

| 4,048,452 | A | | 9/1977 | Oehring et al. | |
|---|---|---|---|---|---|
| 5,206,903 | A | | 4/1993 | Kohler et al. | |
| 5,309,513 | A | | 5/1994 | Rose | |
| 5,594,791 | A | | 1/1997 | Szlam et al. | |
| 5,784,452 | A | * | 7/1998 | Carney | 379/265.06 |
| 5,793,861 | A | | 8/1998 | Haigh | |
| 5,825,869 | A | * | 10/1998 | Brooks et al. | 379/265.12 |
| 6,052,460 | A | | 4/2000 | Fisher et al. | |
| 6,058,435 | A | * | 5/2000 | Sassin et al. | 719/331 |
| 6,088,411 | A | * | 7/2000 | Powierski et al. | 375/364 |
| 6,088,441 | A | | 7/2000 | Flockhart et al. | |
| 6,134,530 | A | * | 10/2000 | Bunting et al. | 705/7 |
| 6,263,066 | B1 | | 7/2001 | Shtivelman et al. | |
| 6,330,326 | B1 | | 12/2001 | Whitt | |
| 6,347,139 | B1 | | 2/2002 | Fisher et al. | |
| 6,404,747 | B1 | * | 6/2002 | Berry et al. | 370/270 |
| 6,408,066 | B1 | * | 6/2002 | Andruska et al. | 379/265.12 |
| 6,556,671 | B1 | * | 4/2003 | Beauvois | 379/265.02 |
| 6,563,920 | B1 | * | 5/2003 | Flockhart et al. | 379/265.1 |

(Continued)

*Primary Examiner* — Antim Shah
*Assistant Examiner* — Kharye Pope
(74) *Attorney, Agent, or Firm* — Pillsbury Winthrop Shaw Pittman LLP

(57) ABSTRACT

The present invention relates to the assignment of calls to groups of call handlers in a call center environment. According to certain aspects, the present invention achieves an optimal balance between the level of service and overall cost by assigning a "common" pool skill to all call handlers in the system and by secondarily assigning one or more additional "rare" pool skills to each call handler. In this configuration, any call handler may receive calls (or other multiple media work assignments) from the states in the common pool while also receiving calls from the states in their additional rare pool(s). According to other aspects, a method according to the invention optimizes the selection of the skills to be included in each of the pools.

15 Claims, 6 Drawing Sheets

(56) References Cited

U.S. PATENT DOCUMENTS

| | | |
|---|---|---|
| 6,584,192 B1 | 6/2003 | Augsta |
| 6,661,889 B1 * | 12/2003 | Flockhart et al. ........ 379/265.05 |
| 6,704,410 B1 * | 3/2004 | McFarlane et al. ...... 379/265.05 |
| 6,741,698 B1 * | 5/2004 | Jensen ..................... 379/265.02 |
| 6,766,012 B1 * | 7/2004 | Crossley .................. 379/265.02 |
| 6,771,765 B1 | 8/2004 | Crowther et al. |
| 6,845,154 B1 * | 1/2005 | Cave et al. ............... 379/265.02 |
| 7,035,808 B1 * | 4/2006 | Ford ............................ 705/7.14 |
| 7,072,966 B1 * | 7/2006 | Benjamin et al. ............. 709/228 |
| 7,110,525 B1 * | 9/2006 | Heller et al. ............. 379/265.11 |
| 7,117,205 B2 | 10/2006 | Pisani |
| 7,200,219 B1 * | 4/2007 | Edwards et al. ......... 379/265.01 |
| 7,269,253 B1 * | 9/2007 | Wu et al. .................. 379/265.11 |
| 7,676,034 B1 * | 3/2010 | Wu et al. .................. 379/265.01 |
| 7,801,111 B2 * | 9/2010 | Coussement ................. 370/352 |
| 2001/0024497 A1 * | 9/2001 | Campbell et al. ......... 379/265.09 |
| 2003/0123642 A1 * | 7/2003 | Alvarado et al. ........ 379/266.01 |
| 2004/0252823 A1 | 12/2004 | Becerra et al. |
| 2005/0195960 A1 * | 9/2005 | Shaffer et al. ............ 379/265.02 |
| 2005/0207559 A1 * | 9/2005 | Shtivelman et al. ...... 379/266.06 |
| 2005/0286709 A1 * | 12/2005 | Horton et al. ............. 379/265.09 |
| 2006/0093123 A1 | 5/2006 | Becerra et al. |
| 2006/0104433 A1 * | 5/2006 | Simpson et al. ......... 379/266.07 |
| 2006/0143058 A1 * | 6/2006 | Brunet et al. ..................... 705/7 |
| 2006/0147026 A1 * | 7/2006 | Statham et al. .......... 379/265.02 |
| 2006/0245580 A1 * | 11/2006 | Hein et al. ................ 379/265.12 |
| 2007/0081662 A1 * | 4/2007 | Altberg et al. ........... 379/355.03 |
| 2007/0116240 A1 * | 5/2007 | Foley et al. ............... 379/265.02 |
| 2007/0201684 A1 * | 8/2007 | Boghani ...................... 379/360 |
| 2008/0049929 A1 * | 2/2008 | Miloslavsky et al. .... 379/265.12 |
| 2008/0285739 A1 * | 11/2008 | Golitsin et al. .......... 379/265.09 |

* cited by examiner

| Pool Skill (200) | State Skill (202) | Time Zone (204) | % of Calls (206) | % of Sales (208) | Sale-to-Call Index (210) | Skill-specific fee ($) (212) | Special Training (214) | % of Agent Assignment (216) |
|---|---|---|---|---|---|---|---|---|
| A | AZ | M | 2.3% | 2.0% | 0.88 | 60 | N | |
| A | CA | P | 14.5% | 13.9% | 0.96 | 234 | N | |
| A | FL | E | 8.2% | 7.4% | 0.90 | 119 | Y | |
| A | GA | E | 4.1% | 3.4% | 0.83 | 65 | N | |
| A | IL | C | 3.0% | 3.0% | 0.99 | 250 | N | |
| A | IN | E | 1.9% | 2.3% | 1.19 | 90 | N | |
| A | LA | C | 0.5% | 0.0% | 0.06 | 75 | N | |
| A | MD | E | 2.7% | 3.3% | 1.23 | 54 | Y | |
| A | MI | E | 5.6% | 5.9% | 1.05 | 10 | Y | |
| A | MN | C | 2.0% | 2.1% | 1.02 | 80 | Y | |
| A | MO | C | 2.3% | 2.3% | 0.98 | 100 | N | |
| A | NC | E | 2.6% | 2.7% | 1.01 | 30 | N | |
| A | NY | E | 2.4% | 2.1% | 0.90 | 144 | Y | |
| A | OH | E | 3.4% | 3.9% | 1.13 | - | N | |
| A | PA | E | 3.5% | 4.2% | 1.20 | 110 | N | |
| A | SC | E | 1.8% | 2.2% | 1.21 | 20 | N | |
| A | TN | E | 1.9% | 1.9% | 1.01 | 58 | N | |
| A | TX | C | 7.1% | 7.8% | 1.10 | 50 | N | |
| A | VA | E | 2.0% | 3.2% | 1.57 | 30 | N | |
| A | WA | P | 1.8% | 2.4% | 1.30 | 50 | N | |
| A | WI | C | 1.8% | 2.0% | 1.15 | 85 | N | |
| Subtotal | 21 | | 75.8% | 77.9% | 1.03 | 1,714 | | |
| B | AR | C | 1.3% | 1.3% | 0.93 | 35 | N | |
| B | KS | C | 0.8% | 0.8% | 0.92 | 80 | Y | |
| B | NV | P | 1.0% | 1.1% | 1.13 | 205 | N | |
| B | OR | P | 1.6% | 1.9% | 1.23 | 75 | Y | |
| B | UT | M | 0.9% | 0.5% | 0.59 | 77 | Y | 218 |
| Subtotal | 5 | | 5.7% | 5.6% | 0.99 | 472 | | 25.4% |
| C | CT | E | 1.0% | 1.3% | 1.32 | 75 | N | |
| | DC | E | 0.5% | | | | | |

| | | | | | 1.14 | 210 | N | |
|---|---|---|---|---|---|---|---|---|
| E | RI | E | 0.5% | 0.5% | 1.05 | 55 | N | |
| E | SD | C | 0.3% | 0.2% | 0.69 | 30 | N | |
| E | VT | E | 0.3% | 0.4% | 1.38 | 144 | N | |
| E | WV | E | 1.1% | 0.7% | 0.58 | 40 | N | |
| E | WY | M | 0.3% | 0.3% | 0.97 | 75 | N | 220 |
| Subtotal | 10 | | 5.4% | 5.2% | 0.96 | 829 | | 23.4% |
| F | DE | E | 0.5% | 0.6% | 1.10 | 144 | Y | |
| F | KY | E | 2.4% | 2.6% | 1.07 | 150 | Y | |
| F | MA | E | 0.8% | 0.3% | 0.34 | 300 | Y | 222 |
| Subtotal | 3 | | 3.7% | 3.4% | 0.92 | 594 | | 15.4% |
| Total | 51 | | 100.0% | 100.0% | | 4,911 | | 100.0% |

*FIG. 2*

METHOD FOR OPTIMIZING SKILL ASSIGNMENT IN CALL CENTER AGENT APPLICATIONS

CROSS-REFERENCE TO RELATED APPLICATIONS

The present application is based on, and claims priority from, U.S. Provisional Appln. No. 60/855,035, filed Oct. 27, 2006, the contents of which are incorporated herein by reference in their entirety.

FIELD OF THE INVENTION

The invention relates generally to call management methods and systems for distributing multiple media communications in call centers, and more particularly to the assignment of routing-related skills to individual call handling agents.

BACKGROUND OF THE INVENTION

In the area of automatic call distribution (ACD) systems, there are limitations as to the quantity of skills a call handler (e.g., a call center agent) may be allotted. However, a call center for a national insurance agency may employ state-licensed insurance agents for all 50 of the United States, and provide insurance products for several lines of businesses (e.g. auto, health, life, etc.). If such a call center assigns agents to multiple states and multiple lines of business (LOB), the overall number of state-LOB skills might exceed the skill allotment limitations of the ACD equipment. Methods for distributing "common" and "rare" skills among call handlers are discussed in U.S. Pat. No. 6,088,411 to Flockhart et al. However this reference does not describe any method for optimizing the skill distribution where ACD equipment limitations may exist. Other similarly deficient prior art methods of call center skill distribution include U.S. Pat. No. 4,048,452, issued September, 1977 to Oehring, et al. U.S. Pat. No. 5,825,869 issued October, 1998 to Brooks, et al., U.S. Pat. No. 6,088,441 issued July, 2000 to Flockart, et al., U.S. Pat. No. 6,408,066 issued June, 2002 to Andruska, et al., U.S. Pat. No. 6,584,192 issued June, 2003 to Agusta, U.S. Pat. No. 6,771,765 issued August, 2004 to Crowther, et al. and U.S. Pat. No. 7,072,966 issued July, 2006 to Benjamin, et al.

Accordingly, a need remains for a method for optimizing the skills assigned to the call handlers to meet the business needs of the call center. The method must address and/or balance the following areas: Limit the quantity of skills assigned to each call handler such that the quantity does not exceed the hardware or software limitations of the ACD system; Achieve a desired level of service; Typically expressed as average speed of answer (ASA) or a percentage of calls answered within a specified time interval, 80 percent in 20 seconds is an industry standard; Balance call handling opportunities, in the case of a call center where the call handlers are compensated for the calls that they answer; Minimize (or otherwise optimize) the cost of training call handlers for each acquired skill; Minimize (or otherwise optimize) the amount of information that the call handler is required to retain related to any acquired skill.

SUMMARY OF THE INVENTION

The present invention relates to the assignment of calls to groups of call handlers in a call center environment. According to certain aspects, the present invention achieves an optimal balance between the level of service and overall cost by assigning a "common" pool skill to all call handlers in the system and by secondarily assigning one or more additional "rare" pool skills to each call handler. In this configuration, any call handler may receive calls (or other multiple media work assignments) from the states in the common pool while also receiving calls from the states in their additional rare pool(s). According to other aspects, a method according to the invention optimizes the selection of the skills to be included in each of the pools.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 2 is a chart which shows an example of a state skill evaluation based on per-agent licensing costs and the projected call volumes.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention relates to a method for optimizing the distribution of skills to call handlers by grouping desired proficiencies into skill "pools" and then assigning individual call handlers to the "pools."

Figure 1:
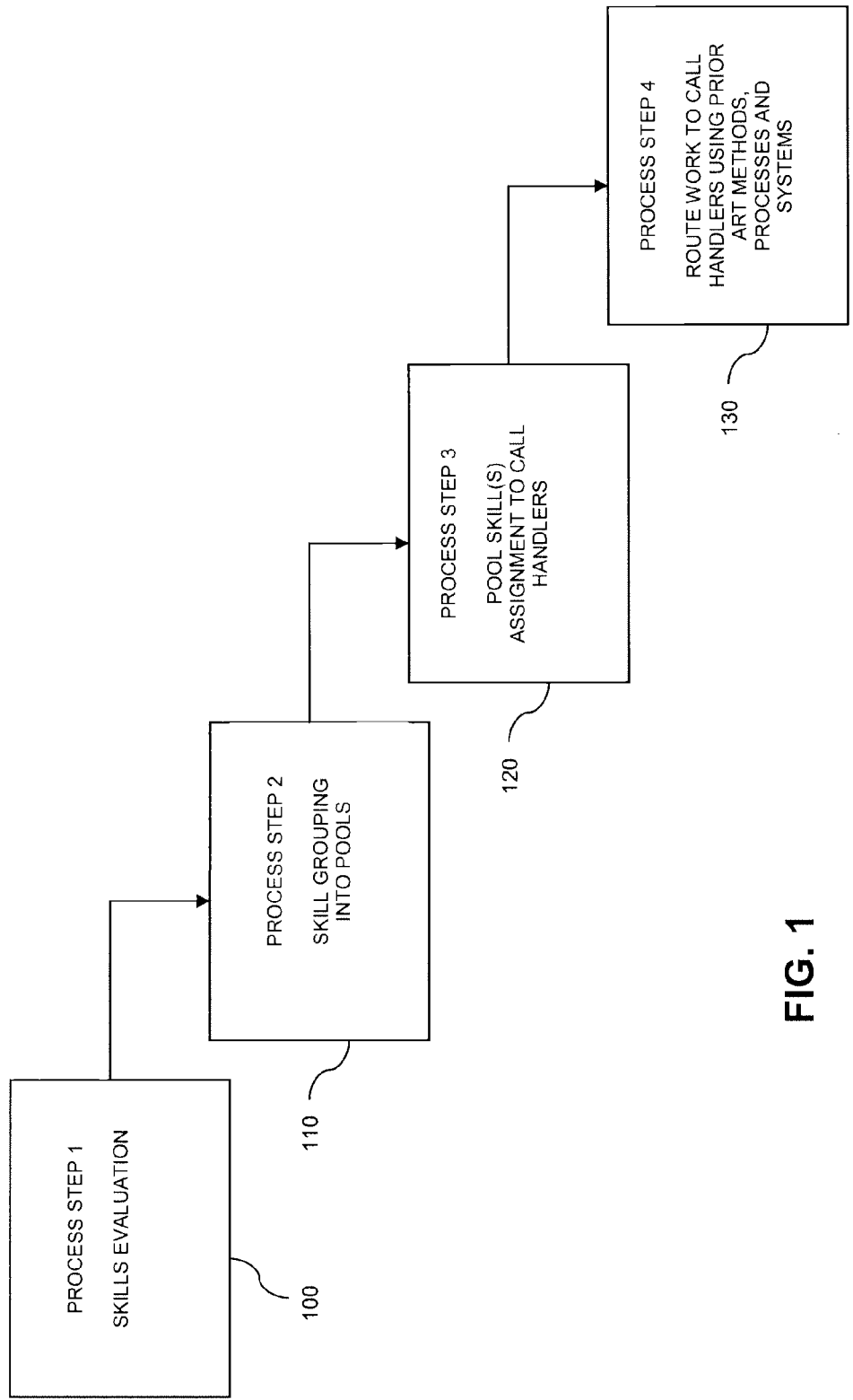
FIG. 1 is a flowchart depicting a general process according to the invention.

FIG. 1 is a flowchart illustrating general aspects of a skill grouping and call handler assignment process according to the invention. In this illustration, the process is divided into four steps. In a first step 100, a skills evaluation is undertaken to determine the relative ranks of each of the skills to be assigned to the call handlers. This is followed by step 110 in which pools are created for the selected, evaluated and prioritized skills. In step 120, a pool skill(s) assignment to call handlers is accomplished. For example, the assigned skill(s) may be entered in an ACD system, computer telephony integration (CTI) system, or any system used to route multiple media communications (e.g. telephone calls) to call handlers. Step 130 depicts routing calls to call handlers using prior art methods, processes, and systems, but based on the skill pools and assignment methods of the invention.

For purposes of illustration, certain aspects of the invention will now be described in more detail in connection with an example implementation in an insurance call center. In this example, each state requires persons who sell insurance products to be trained for and/or licensed by that state. Accordingly, a call handler's "skills" correspond to the ability of that handler to assist with calls regarding insurance products for a calling person's state. In one example, the quantity of state proficiencies in each pool is optimized around cost of the skill (e.g., training, licensing, etc.) and projected call volume. From a call center queuing perspective, providing every call handler (i.e., a single pool) with all possible skills provides the highest level of service but also incurs the greatest licensing and training costs. At the other extreme, assigning only one skill to each individual call handler would provide the lowest overall cost but also the lowest level of service. In this scenario, each caller would need to wait for a specifically-skilled call handler to become available to service their request even though other differently-skilled call handlers might be available.

It should be noted that while the foregoing illustration will focus primarily on an insurance call center implementation, the invention is not limited to such an implementation. Rather, the principles of the invention can be extended to many types of call centers other than for an insurance agency, and is not limited to telephone call centers, but can extend to various types of customer service communication technologies such as email, voice and video chat, text messaging, etc.

An example implementation of skills evaluation step 100 in air insurance cull center will now be described in connection with FIG. 2. FIG. 2 illustrates a possible chart 250 that can be generated in this step, and shows example types of criteria that can be developed for use in evaluating skills. As shown in this example, chart 250 consists of the following criteria for evaluating each state (i.e. skill) 202: time zone 204, percentage of calls 206, percentage of sales 208, sale-to-call index 210, skill-specific fee 212, special training 214, and percentage of agent assignment 216. In one example implementation, the chart 250 is an Excel spreadsheet, trademark of Microsoft Corporation of Redmond, Wash. It is used to identify the evaluation criteria of each state (i.e. skill) 202 from which calls can be received by the center (identified by the standard state abbreviation).

In one example implementation, chart 250 is prepared in an offline process before an ACD system is initialized or updated. For example, the chart 250 can be prepared and then the results can be used by an administrator to manually configure the ACD system. However, many variations are possible. For example, chart 250 need not be produced in visual form; rather it may be prepared in the form of computer tables that are used to dynamically and automatically configure an ACD system, and/or fed to an ACD system.

As another example, the information used to populate the criteria in the chart is obtained from other data sources and systems then manually entered into the chart. For example, the training and skill-specific fee information can be identified in a manual process of collecting information from government agencies and other sources, while sales information can be obtained from historical sales report from internal accounting systems. However, this is not necessary, and automatic processes of obtaining and updating some or all of the criteria are possible.

It should be noted that the criteria discussed herein are provided for illustration only, and that some or all of the criteria can be substituted with other criteria while remaining within the scope of the invention. For example, while the above criteria are considered advantageous for evaluating state skills in an insurance application, other criteria may be used for other types of skills, including those within the same application or other applications.

It should be further noted that more than one chart can be created and used to configure an ACD or similar system. For example, multiple charts can be created for other lines of business, and/or one chart can be created with other lines of business as a criteria. Those skilled in the art will understand various other alternatives.

Returning to the example shown in FIG. 2, one of the evaluation criteria in this example is time zone 204 of the majority (since some states have more than one time zone) of the state's callers. In some embodiments, this criteria can be used because, depending on the call centers' physical locations, operating hours and staffing levels, it may be strategically advantageous to group states that share the same, or contiguous, time zone(s).

As further shown, other evaluation criteria include the state's historical or expected call volumes 206 as a percentage of total call volume. The state percentage of calls 206 can be calculated by the dividing the expected call volume for that state by the sum of calls from all of the states. Likewise, the state percentage of sales 208 can be calculated by dividing the sales derived from the state by the total sales derived from all states. The percentage of sales 208 can be based on the value of the sale, the quantity of sales, a profit margin-weighted value, or another suitable other measure of sales volume.

The sale-to-call index 210 is calculated by dividing the percentage of sales 208 by the percentage of calls 206. In general, such an index criterion is evaluated based on its variance from the average. For example, a sale-to-call index 210 of 1.00 represents the average for all of the state skills. A sale-to-call index 210 greater than 1.00 represents a state skill with sale-to-call ratio that is better than the national average. A sale-to-call index 210 of less than 1.00 represents a state skill with a ratio less than the national average.

Other criteria that can be used for evaluation include the skill-specific fee 212. In one example, this is a state-regulated agent licensing fee. In other cases this may indicate whether any other costs (e.g., user fees, setup fees, registration fees) are associated with the skill. Similarly, the special training 214 can indicate whether or not (i.e. Yes or No) state-specific training is required for this state. This field 214 can alternatively include other criteria that may be evaluated with a Boolean or mathematical expression, such as a typical state training cost.

Referring back to FIG. 1, in step 110 of the overall process, the skills are grouped into pools. This is preferably based directly on the evaluation criteria developed in skills evaluation step 100. The chart in FIG. 2 also shows an example of a completed process in which the state skills have already been grouped into pool skills 200. Once the skill to be evaluated has been identified (e.g. state skill), the skills are grouped into pools as described in more detail below in connection with the flowchart in FIG. 5.

Figure 5:
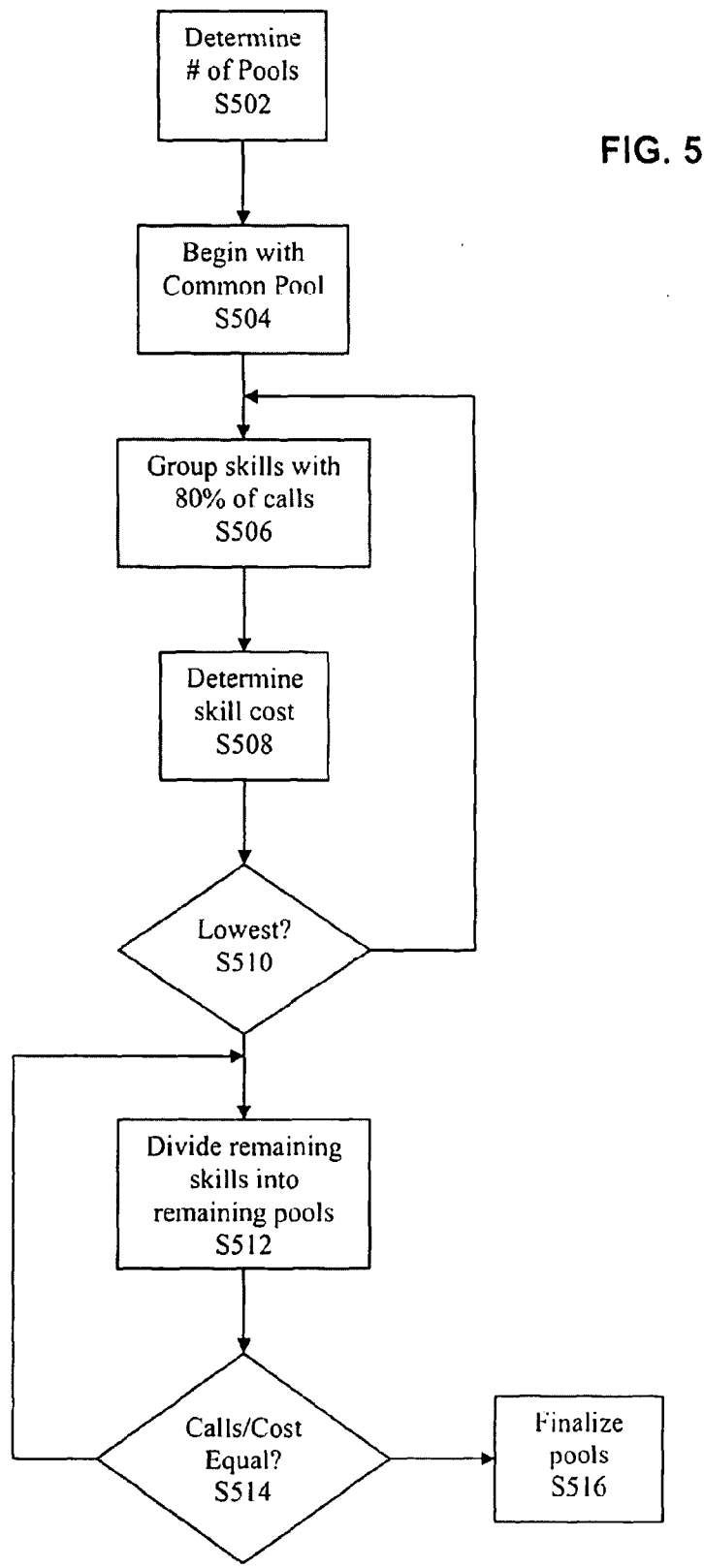
FIG. 5 is a flowchart illustrating an example process of creating skill pools.

As shown in FIG. 5, a process in one example embodiment starts in step S502 with determining a number of pools to be formed. According to aspects of the invention, this is determined based on the capabilities of the ACD system. For example, some versions of PBX/ACD systems can only allow 20 skills to be specified for each call handler. In a nationwide application where individual call handlers can potentially service calls from all areas of the country, but need to be skilled to handle calls from many states, the needs of the call center can therefore greatly exceed the abilities of the conventional systems.

Accordingly, the number of skill pools can be selected by subtracting the total possible number of other skills to be entered for each caller (e.g. language, level of experience, affinity group specialties, lines of business proficiencies/licenses, etc.) from the maximum number of skills, along with possibly an additional margin for future expansion.

Processing continues in step S504 by first selecting skills to be included in a "common" pool. According to aspects of the invention, the common pool is formed to provide the highest possible service at the lowest possible cost. A common goal in call centers is to have 80% of calls answered within 20 seconds or less. According to one example of the invention, therefore, the common pool is formed to include states (i.e. skills) from which 80% of the calls are received. Moreover, according to additional aspects of the invention, a goal is to minimize costs for providing a high level of service. In this example, therefore, skills which have a low fee percentage-to-sales percentage ratio are grouped into the "common" pool.

Accordingly, as shown in FIG. 5, an iterative process is performed to determine the common pool. More particularly, beginning in step S506, a group of states is identified for which the sum of calls or sales derived from those combined states equals about 80% of the total (as specified in the percent of calls 206 or percent of sales 208). Then, in step S508, the total cost of the skills in this group is determined, for example by summing the skill-specific fee 212 (e.g. license fee) for each state in the group. In step S510, it is determined if this is the lowest cost group. If not, processing returns to step S506, where a different group of states is identified. Otherwise, the common pool is determined from this group.

For example, the A skill pool 200 in FIG. 2 is the "common" pool after completion of the iterative process in steps S506-S610. More specifically, FIG. 2 shows a group of 21 specific states in the A pool skill 200. The percentage of sales 208 from the combination of the A pool states is 77.9%. The skill-specific fee 212 for the A pools states is 34.9% of the total ($1,714/$4.911=34.9%). So, for about 35% of the cost of licensing an agent in every state, that agent can handle almost 80% of the calls the agency receives.

Processing continues by forming the remaining pools out of the total number determined in step S502. In this example, another iterative process is performed. In step S512, the remaining skills are split into the number of remaining pools (e.g. the total number in step S502 minus one for the common pool). In step S514, the total number of calls or sales (e.g. from criteria 206 or 208) and the total cost (e.g. the sum of fees 212) for each group are calculated and compared. In one example, the goal is to have the calls/sales and cost for each remaining pool to be about equal between groups. If so, the rare pools are finalized in step S516. Otherwise, processing returns to step S512 where the skills are distributed in a different manner, and the call/cost determination is repeated.

Some or all of the above-described processing can be accomplished manually or via computer programs (e.g. Excel spreadsheet macros or dedicated programs that feed to an ACD system or the like) that efficiently define the pools based on predetermined rules. For example, the rules can specify that pools must have approximately equal calls, pools must contain states in the same or contiguous time zones, pools must not exceed a specified licensing cost, etc. If the process of establishing the pools is to be done many times, automation would be a preferred alternative. If pool establishment is a rare occurrence, manual processing would likely suffice.

Figure 3:
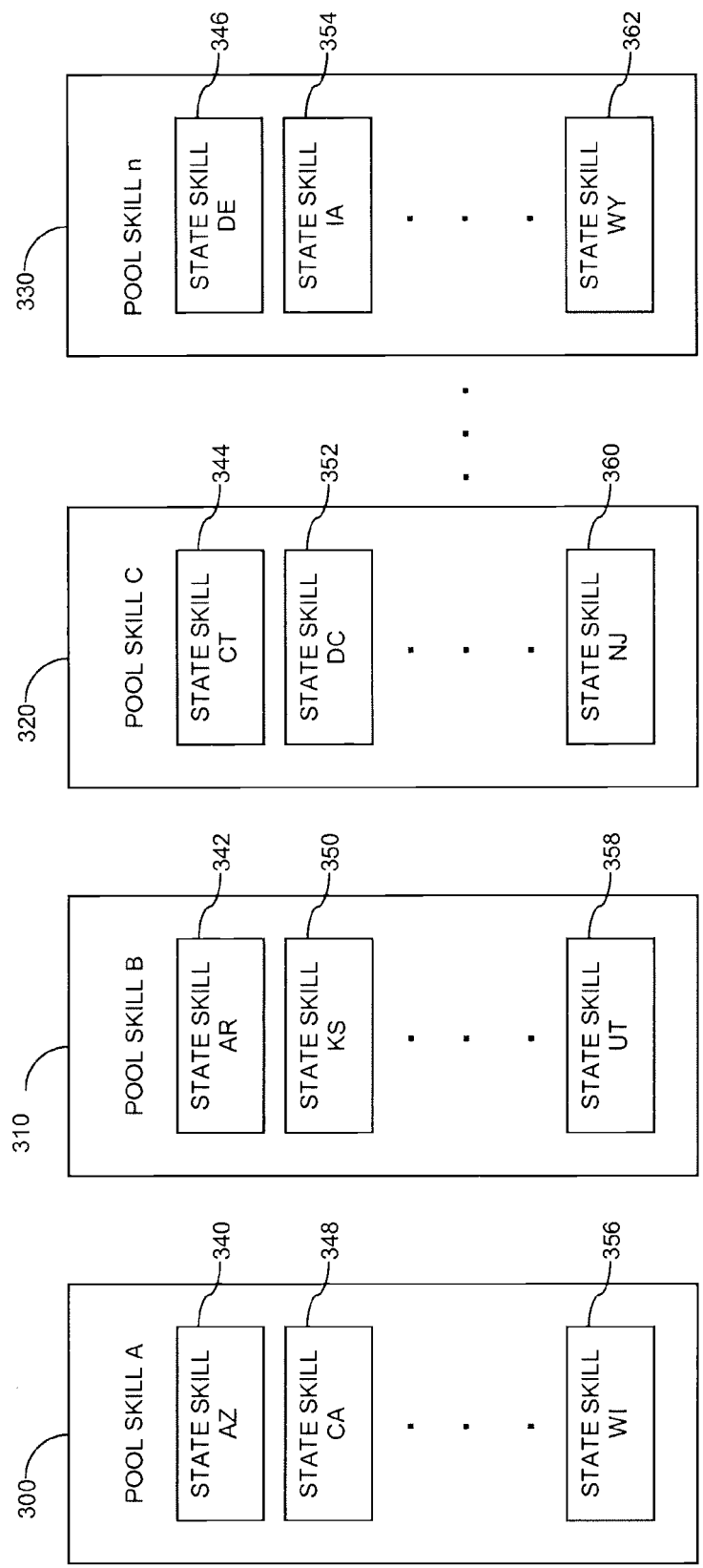
FIG. 3 is a block diagram illustrating an example result of aggregating state skills into pools.

FIG. 3 illustrates grouping the state skills into pools of state skills according to aspects of the invention. A pool skill A 300 is shown as a collection of a number of state skills. For illustration purposes, FIG. 3 shows three state skills in pool skill A 300; however, the number of state skills in any of the pool skill groups may vary from a single state skill to many state skills. From the example in FIG. 2, the pool skill A 300 is comprised of 21 state skills. The quantity of state skills in each pool is not dependent on the quantity of skills in any other pool. In the example in FIG. 2, there are five states in the B pool and three states in the F pool.

In one preferred embodiment, state skills are not shared among the pool skill groups. That is, each individual state skill is grouped into one and only one pool skill group. In FIG. 3, the pool skill A 300 is depicted as containing the state skills: AZ, CA and WI, although the other state skills in that pool are not shown. Each of the state skills 340-362 is contained in one and only one pool skill group.

Returning to FIG. 1, the third step 120 in the process is the pool skill(s) assignment to call handlers. Once the skills are grouped into the pools, individual call handlers are assigned to them for multiple media communications routing, for example, an ACD system. As set forth previously, according to aspects of the invention, all call handlers are assigned to the "common" pool skill. Moreover, each call handler is assigned to one "rare" pool skill.

In one example implementation, the percentage of agents assigned to each "rare" skill is determined by the percentage business (e.g., the percentage of sales 208) of all of the states in that skill pool when compared to the total business for the states in any of the "rare" pool skills. In the example of FIG. 2, the percentage of agent assignment to the B pool skill is 25.4%. This is calculated by dividing the 5.6% of sales that is attributed to the B pool skill by 22.1%, which is the total percentage of sales 218 for all of the "rare" pool skills (B through F). Therefore, 25.4% of the call handlers should be assigned the A and B pool skill 200.

Figure 4:
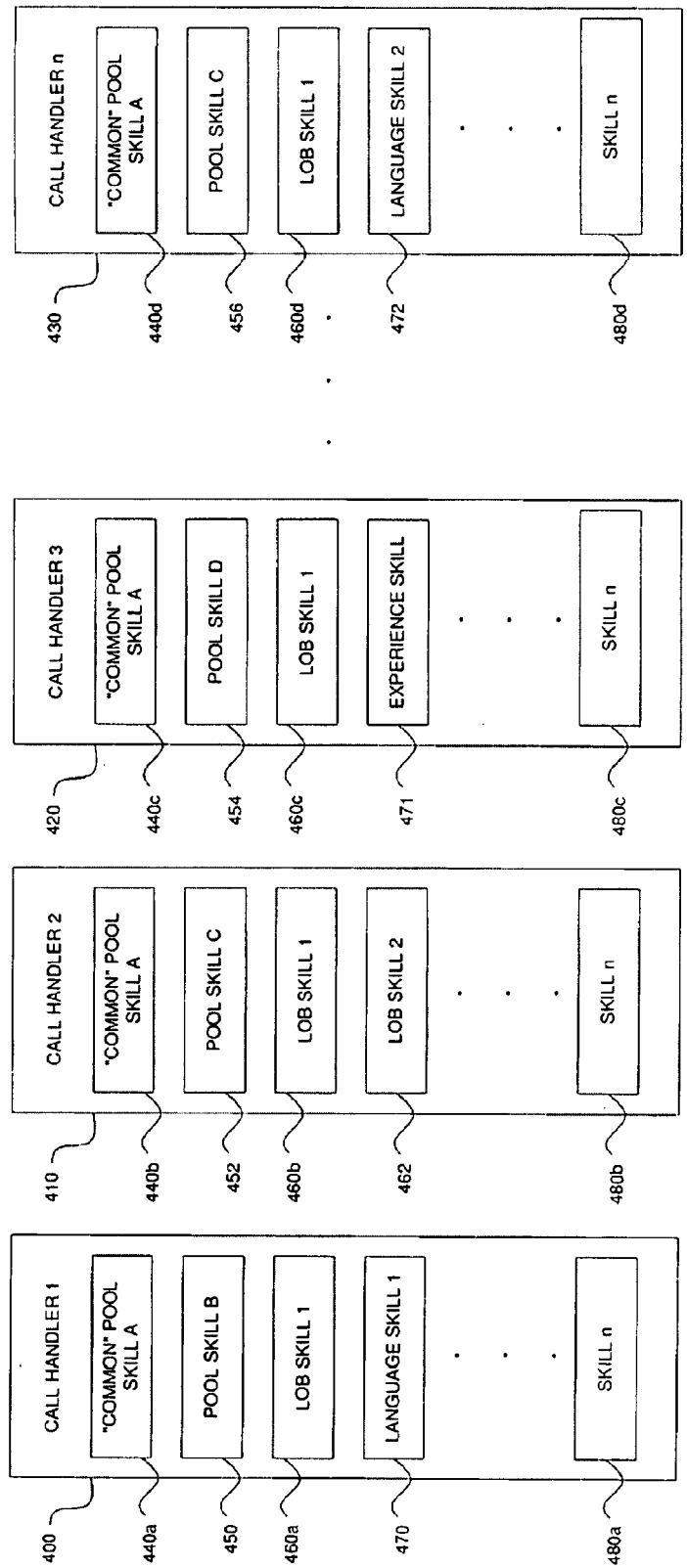
FIG. 4 is a block diagram illustrating an example assignment of a common skill and additional skills to call handlers (e.g., call center agents)

FIG. 4 further illustrates aspects of assigning skills to call handlers 400-430. A "common" skill pool A 440a-440d is assigned to each call handler. By assigning this skill to all of the call handlers, a greater number of call handlers are available for calls from the states in the "common" skill pool A 440a-440d. This increases the performance metrics (e.g., service levels) for calls from the included states because a greater number of agents are available to work on requests from those states. In addition, it provides a call balance among agents by allowing them to take calls from a greater quantity of states. If an agent were limited to taking calls from a single (or few) state(s), they would likely remain idle waiting for a call from that state. This would be perceived by any such call handler as an inequitable position. The larger the quantity of calls that are received from the "common" skill pool A 440a-440d, the more equitable the perceived position.

In FIG. 4 one additional "rare" pool skill is assigned to each call handler. A first call handler 400 is assigned a pool skill B 450, while a second call handler 410 is assigned a pool skill C 452. In addition to these pool skill assignments, each call handler may be assigned any number of other job-related skills within the limits of the ACD. As shown in FIG. 4, examples of other skills include an LOB (line of business) skill 460*a*, a language skill 470, and an experience skill 471. These skills, as described in prior art, can be used for the routing of multiple media communications (e.g. telephone calls) to qualified call handlers.

Figure 6:
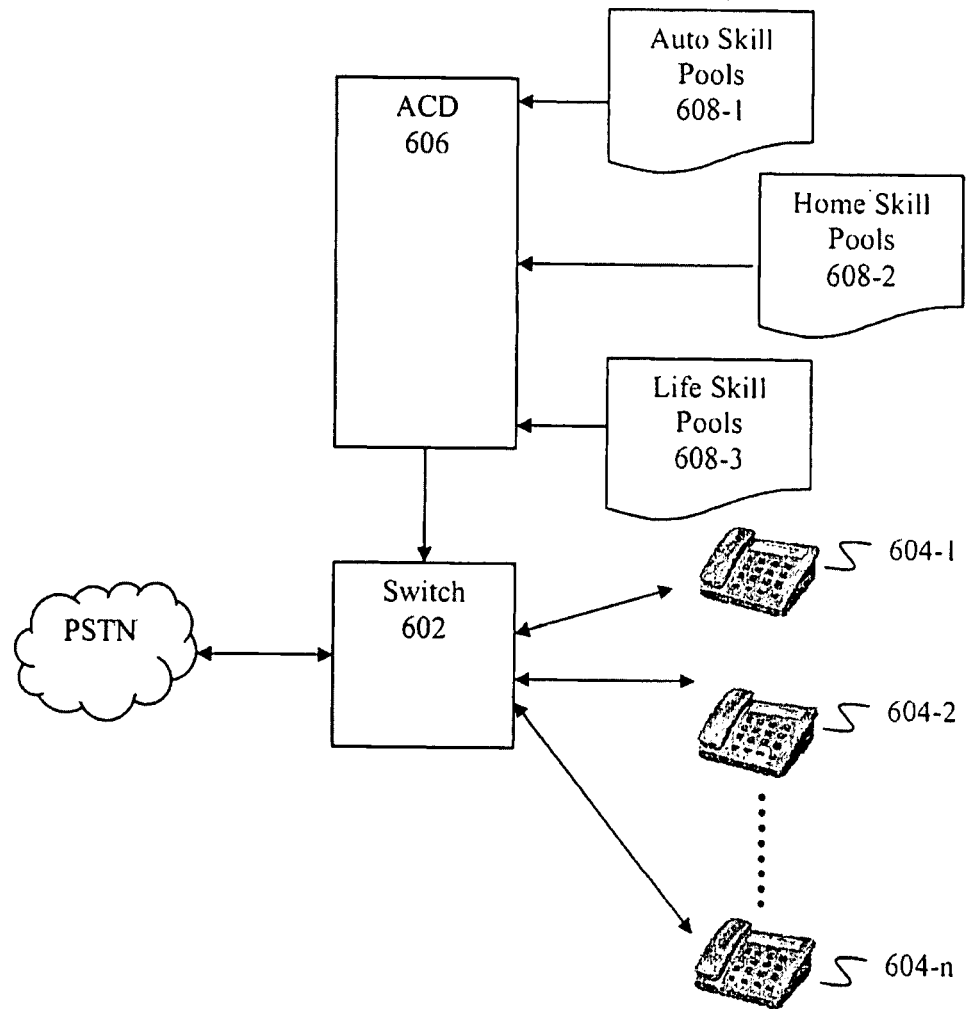
FIG. 6 is a block diagram illustrating one example implementation of the invention in a call center.

FIG. 6 illustrates example implementations of the principles of the invention in a call center system. As shown in FIG. 6, a switch 602 distributes incoming calls from customers via a telephone network such as the PSTN to call handlers 604-1 to 604-*n*. The switch is controlled by an ACD 606. The ACD uses skill pools 608 to determine how to distribute calls from customers to call handlers 604. Customers can also interact with an interactive voice response (IVR) system (not shown) to select a line of business, state, etc. Switch 602 can also include a computer telephony integration (CTI) system (not shown) that call handlers use in the process of handling a call.

In one example implementation, switch 602 and ACD 606 are included in a Definity G3R PBX/ACD system from Avaya. Such a system can include over 200 simultaneous phone calls handled by up to 300 concurrently connected call handlers 604. Version 8 of such a system allows 20 skills per agent, and Version 12 of such a system allows 60 skills per agent. The PBX/ACD can include a bridge to a IVR such as an Avaya Conversant IVR/VRU and an Avaya CT CTI system. It should be noted that this is merely one possible implementation, and that the invention can be practiced with many other different types and brands of call center systems, CTI systems, ACD systems, IVR systems, etc.

In this example, there are different state skill pools 608-1, 608-2, 608-3 (e.g. auto, home and life) for different lines of business (i.e. types insurance products). However, there could be just one skill pool for all lines of business, with the different lines of business identified as separate skills. In the example implementation referred to above, the skill pools are entered manually into the Definity ACD system, but other implementations can include programmatic entry. A manual method can be used for human convenience when looking at the setup. Each call handler has 60 "slots" in which to enter skills. When data is entered manually, a specific skill slot designates a specific state. For example, slot number 5 might be used to designate the skill for the state of California. So, for each call handler, the skill in slot 5 will always provide the skill for California. When the data is lined up for many agents in rows, it's easy to visualize which agents are able to answer California calls by looking down the slot 5 column. On the other hand, if information is entered programmatically on the switch, the skills may be assigned to the first available slot, which means the California skill may not always be in slot 5. Although call routing would not be affected, the ability for humans to easily visualize the setup would be hindered.

While the invention has been described above according to certain possible embodiments, many other modifications to the method and system for assigning skills to call handlers are possible. For example, skills may be assigned to call handlers without a single "common" pool, but with pools formed so as to perform the 80% service as described above. Moreover, the "common" pool is not required to cover a large percentage of the business. In general, where there are a large number of call handlers, fewer skills may need to be included in a "common" pool. Conversely, in applications where there are fewer call handlers, a larger percentage of the skills may be included in the "common" pool.

As another alternative, any number of pools may be assigned to a call handler, instead of just one common pool and one rare pool. For example there may be several rare pools assigned to call handlers. Moreover, there may be two or more "common" pools, with call handlers divided evenly among the common pools.

It should also be noted that the described method may be used in non-call center applications. It would be beneficial in any setting where a plurality of variably skilled professionals respond to requests from a queue of customers. In non-call center applications, the skills need not be entered into an ACD system, but would be entered into similar load balancing and distribution methods, such as email and IM distribution systems. Moreover, such I could such skill pooling could be used in an environment such as a department of motor vehicles office where customer service representatives have varying skills for processing varying requests (e.g. drivers licensing, automobile registration, fingerprinting, etc.). Each representative might be assigned skills such that they can process a high percentage of the requests while rarer skills are assigned as secondary skills.

Still further, the pools may be used for management and reporting purposes only, without assigning them to call handlers. The pools provide a convenient means to monitor call center activities such as for grouping both incoming and outgoing multiple media communications by pool for reporting purposes. This benefit exists whether or not the pools are used for routing the multiple media communications to the call handlers.

As another alternative, skill evaluation criteria may include other factors that are not described in this document. One such criterion might be a weighting factor of the state's proximity to a metropolitan statistical area (MSA). For example, each state may be assigned a New York City (NYC) MSA proximity weight (PM):

| State Skill | NYC MSA PM | Reason |
|---|---|---|
| NY | 100 | residency |
| NJ | 80 | commuter |
| FL | 20 | seasonal residence |
| CA | 10 | bi-coastal residence (if the business is related to the entertainment industry, the proximity weight for CA might be adjusted due to the influence of bi-coastal commuters). |

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of optimizing distribution of skills among call handlers for providing a financial services product to callers via the call handlers in an agency having an automatic call distribution system, the method being implemented by one or more computers, the method comprising:
    identifying a plurality of skills needed for handling calls;
    grouping certain of the skills into a common skill pool;
    grouping certain other of the skills into a rare skill pool;
    assigning all the call handlers to the common skill pool, wherein all the call handlers have the certain skills grouped in the common skill pool and can thereby handle calls where those certain skills are needed;
    assigning certain of the call handlers to the rare skill pool, wherein all the certain call handlers have the certain other skills grouped in the rare skill pool and can thereby handle calls where those certain other skills are needed;

causing, by the one or more computers, the certain call handlers assigned to the rare skill pool to handle calls where the certain other skills in the rare skill pool are needed; and allowing, by the one or more computers, available ones of the certain call handlers assigned to the rare skill pool to handle calls where the certain skills in the common skill pool are needed, wherein the step of grouping skills into the common skill pool includes:

identifying a first set of skills needed for a large majority of the calls;

identifying a second different set of skills needed for the large majority of the calls;

comparing a cost associated with the first and second sets to determine the lower cost set;

identifying the skills in the lower cost set as the certain skills; and iteratively performing the first identifying, the second identifying and comparing steps until an absolute lowest cost set is identified; and entering the call handler assignments into the automatic call distribution system, such that calls to the agency are automatically routed to the call handlers according to the assignments.

2. A method according to claim 1, further comprising grouping all of the remaining skills into one or more other rare skill pools.

3. A method according to claim 2, further comprising equalizing a cost and percentage of calls among all of the rare skill pools.

4. A method according to claim 2, further comprising limiting the total number of skill pools based on capabilities of a call distribution system.

5. A method according to claim 1, further comprising routing incoming calls to the call handlers based on the common skill pool and the rare skill pool.

6. A method according to claim 5, further comprising entering the call handler assignments into a call distribution system.

7. A system optimizing distribution of skills among call handlers for providing a financial services product to callers via the call handlers in an agency having an automatic call distribution system, comprising:

one or more computers; and a computer program running on the one or more computers, the computer program being adapted to allow an administrator to:

identify a plurality of skills needed for handling calls;

group certain of the skills into a common skill pool;

group certain other of the skills into a rare skill pool;

assign all the call handlers to the common skill pool, wherein all the call handlers have the certain skills grouped in the common skill pool and can thereby handle calls where those certain skills are needed;

assign certain of the call handlers to the rare skill pool, wherein all the certain call handlers have the certain other skills grouped in the rare skill pool and can thereby handle calls where those certain other skills are needed;

cause the certain call handlers assigned to the rare skill pool to handle calls where the certain other skills in the rare skill pool are needed; and allow available ones of the certain call handlers assigned to the rare skill pool to handle calls where the certain skills in the common skill pool are needed, wherein the portion of the computer program adapted to group skills into the common skill pool is further adapted to:

identify a first set of skills needed for a large majority of the calls;

identify a second different set of skills needed for the large majority of the calls;

compare a cost associated with the first and second sets to determine the lower cost set;

identify the skills in the lower cost set as the certain skills; and iteratively perform the identification of the first set, the identification of the second set and the comparison of the cost until an absolute lowest cost set is identified; and entering the call handler assignments into the automatic call distribution system, such that calls to the agency are automatically routed to the call handlers according to the assignments.

8. A system according to claim 7, wherein the computer program is further adapted to group all of the remaining skills into one or more other rare skill pools.

9. A system according to claim 8, wherein the computer program is further adapted to equalize a cost and percentage of calls among all of the rare skill pools.

10. A system according to claim 8, wherein the computer program is further adapted to limit the total number of skill pools based on capabilities of a call distribution system.

11. A system according to claim 7, further comprising:

a call distribution system adapted to route incoming calls to the call handlers based on the common skill pool and the rare skill pool.

12. A system according to claim 7, wherein the computer program is further adapted to group all of the remaining skills into one or more other rare skill pools, wherein the system further comprises:

a call distribution system adapted to route incoming calls to the call handlers based on the common skill pool and the rare skill pools, wherein the computer program is further adapted to limit the total number of skill pools based on capabilities of the call distribution system.

13. A method of providing a financial services product to callers via call handlers in an agency having an automatic call distribution system, comprising:

identifying a plurality of skills needed by the call handlers for handling calls related to selecting the financial services product;

optimizing distribution of skills among the call handlers, the method comprising:

grouping certain of the skills into a common skill pool;

grouping certain other of the skills into a rare skill pool;

assigning all the call handlers to the common skill pool, wherein all the call handlers have the certain skills grouped in the common skill pool and can thereby handle calls where those certain skills are needed;

assigning certain of the call handlers to the rare skill pool, wherein all the certain call handlers have the certain other skills grouped in the rare skill pool and can thereby handle calls where those certain other skills are needed;

causing the certain call handlers assigned to the rare skill pool to handle calls where the certain other skills in the rare skill pool are needed; and allowing available ones of the certain call handlers assigned to the rare skill pool to handle calls where the certain skills in the common skill pool are needed, wherein the step of grouping skills into the common skill pool includes:

identifying a first set of skills needed for a large majority of the calls;

identifying a second different set of skills needed for the large majority of the calls;

comparing a cost associated with the first and second sets to determine the lower cost set;

iteratively performing the first identifying, the second identifying and comparing steps until an absolute lowest cost set is identified;

identifying the skills in the absolute lowest cost set as the certain skills; and entering the call handler assignments into the automatic call distribution system, such that calls to the agency are automatically routed to the call handlers according to the assignments.

14. A method according to claim 13, further comprising:

grouping all of the remaining skills into one or more other rare skill pools; and limiting the total number of skill pools based on capabilities of the automatic call distribution system.

15. A method according to claim 1, wherein the large majority of calls is 80% or more of incoming calls to an automatic call distribution system implemented by the one or more computers.

* * * * *